United States Patent

Bunin et al.

[11] Patent Number: 5,867,620
[45] Date of Patent: Feb. 2, 1999

[54] FIXTURE FOR FABRICATING A FIBER OPTIC CONNECTOR FERRULE

[75] Inventors: Gregory Bunin, Skokie; Igor Grois, Northbrook; Ilya Makhlin, Wheeling; Mark Margolin, Lincolnwood; Richard F. Roth, Downers Grove, all of Ill.

[73] Assignee: Molex Incorporated, Lisle, Ill.

[21] Appl. No.: 901,850

[22] Filed: Jul. 28, 1997

[51] Int. Cl.⁶ .................................................. G02B 6/36
[52] U.S. Cl. ............................................................. 285/53
[58] Field of Search ....................... 385/50–53, 129–132, 385/147

[56] References Cited

U.S. PATENT DOCUMENTS

| | | | |
|---|---|---|---|
| 4,453,309 | 6/1984 | Shirk | 29/884 |
| 4,858,821 | 8/1989 | Bickelhaupt | 229/123.1 |
| 4,884,878 | 12/1989 | Arenal et al. | 359/704 |
| 4,921,325 | 5/1990 | Iri et al. | 350/96.21 |
| 5,037,179 | 8/1991 | Bortolin et al. | 385/54 |
| 5,134,673 | 7/1992 | Stephenson et al. | 385/56 |
| 5,150,516 | 9/1992 | Boero et al. | 29/877 |
| 5,201,903 | 4/1993 | Corbett, III et al. | 29/872 |
| 5,205,091 | 4/1993 | Brown | 52/126.6 |
| 5,295,700 | 3/1994 | Crews et al. | 279/5 |
| 5,315,678 | 5/1994 | Maekawa et al. | 385/59 |
| 5,339,376 | 8/1994 | Kakii et al. | 385/71 |
| 5,394,495 | 2/1995 | Booth et al. | 385/59 |
| 5,422,971 | 6/1995 | Honjo et al. | 385/80 |
| 5,444,804 | 8/1995 | Yui et al. | 385/49 |
| 5,499,311 | 3/1996 | DeCusatis | 385/89 |
| 5,519,799 | 5/1996 | Murakami et al. | 385/78 |
| 5,548,675 | 8/1996 | Shigematsu et al. | 385/80 |
| 5,548,677 | 8/1996 | Kakii et al. | 385/92 |
| 5,602,951 | 2/1997 | Shiota et al. | 385/81 |
| 5,619,604 | 4/1997 | Shiflett et al. | 385/59 |
| 5,619,605 | 4/1997 | Ueda et al. | 385/80 |
| 5,621,835 | 4/1997 | Takahashi et al. | 385/78 |
| 5,625,730 | 4/1997 | Ishikawa et al. | 385/49 |

FOREIGN PATENT DOCUMENTS 8-62452  3/1996  Japan ................................ G02B 6/40

*Primary Examiner*—Akm E. Ullah
*Attorney, Agent, or Firm*—A. A. Tirva

[57] ABSTRACT

A fixture is disclosed for use in fabricating a connector ferrule for a fiber optic cable which includes a plurality of generally parallel optical fibers. The fixture includes a base, with a receptacle on the base for receiving and properly positioning a ferrule body. A cable locator is provided on the base at one side of the receptacle for positioning the cable inserted in the ferrule body, with exposed end portions of the optical fibers projecting from the ferrule body at an opposite side of the receptacle. A fiber aligner is provided on the base at the opposite side of the receptacle for aligning the exposed end portions of the optical fibers relative to each other and relative to the properly positioned ferrule body.

21 Claims, 7 Drawing Sheets

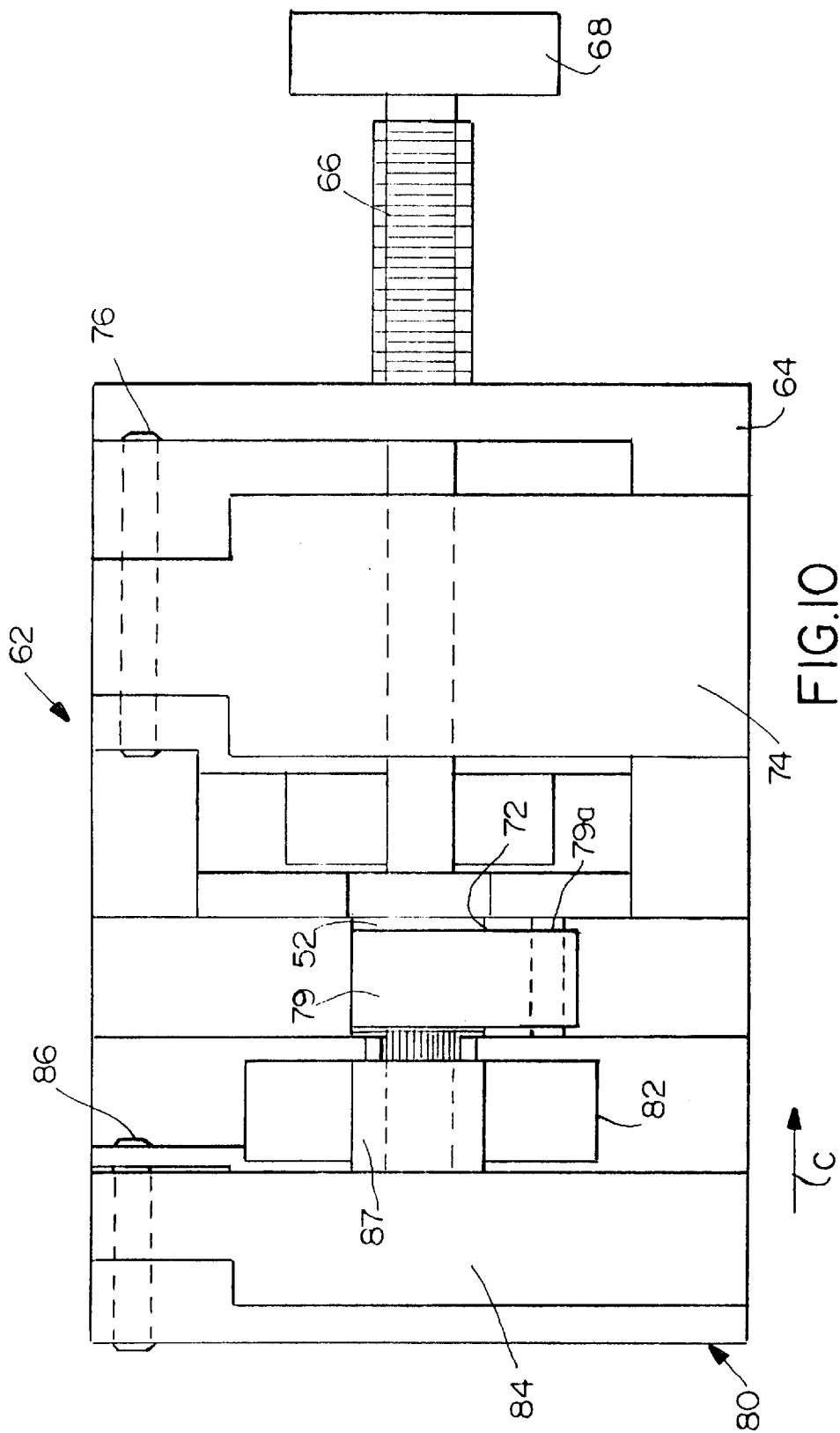

FIXTURE FOR FABRICATING A FIBER OPTIC CONNECTOR FERRULE

FIELD OF THE INVENTION

This invention generally relates to the art of fiber optic connectors and, particularly, to a fixture for use in fabricating a connector ferrule, such as for terminating a multi-fiber cable, particularly a fiber optic ribbon cable.

BACKGROUND OF THE INVENTION

In fiber optic transmission systems, signals are transmitted along optical fibers by optical frequency waves (light) generated by such source as LED's, lasers and the like. Optical fibers typically are fabricated of glass materials and, as optical fiber circuitry developed, it became necessary to provide connecting devices which could couple one optical fiber to another, only in an end-to-end relationship.

A traditional procedure for making a connection between ends of optical fibers is to, first, remove a protective jacket from a given length of fiber at the end of the fiber to be joined. After the jacket is removed, a 250 micron (OD) buffer is exposed which can then be stripped to expose a 125 micron (OD) fiber. The fiber is then threaded through a passage in a ferrule where it is affixed in place by adhesive and/or crimping. The fiber is inserted so as to extend well beyond a front surface of the ferrule. The exposed fiber material is then cleaved and polished. Any remaining adhesive is removed. The ferrules then are assembled into a connector assembly which is intended to position the optical fibers with their optical axes in alignment for connection to the fibers of a mating connector or other appropriate connecting device.

A fiber optic ribbon cable has become increasingly popular to provide multiple channels in a single cable structure. An optical ribbon cable is similar to any other well known ribbon electrical cable to the extent that a plurality of generally parallel optical fibers or channels are disposed in a line or generally coplanar relationship. Terminating the optical fibers of a fiber optic ribbon cable is generally similar to the procedure described above. In general, the unitary protective jacket surrounding the line of fibers is removed so that the buffered fibers are exposed which are then stripped and the unprotected fibers project from the flat cable in a line. Typically, these individual fibers must be inserted into respective individual holes or passages in a prefabricated connector ferrule. The passages align the fibers at a predetermined spacing for coupling to the ends of the fibers in a complementary connector ferrule or other connecting device.

This terminating process of the individual fibers of a multi-fiber cable, creates a number of problems. First, because of the very thin size and extremely fragile nature of the fibers, it can be tedious to insert a fiber into a single aligning hole or passage. However, inserting a plurality of such fibers from a single cable into a plurality of passages can be extremely difficult. If a single fiber of the cable is broken, the stripped cable end and ferrule either must be discarded and/or reworked. Since these processes typically are carried out by hand, they can be rather inefficient and result in unnecessary expense.

In the prior art, placing individual fibers of a multi-fiber cable into individual holes or passages in a connector ferrule results in a high percentage of rejects. The ferrules must be inspected hole by hole. In addition to fibers being broken, the holes, themselves, may be too large or too small or not circular. Connector ferrules comprise bodies which are crystalline in nature, typically of ceramic material. However, they can be molded of plastic or like material. For multiple channel ferrules, the fiber-receiving holes or passages must be formed precisely to maintain proper form or alignment and spacing between the fibers to prevent tolerance problems causing transmission losses during mating.

The above alignment/tolerance problems are further complicated in connector assemblies wherein a pair of mating connector ferrules, themselves, are placed in the mating condition by two alignment pins. These alignment pins typically have one end of each pin extending into a passage of the connector ferrule, and the opposite end of the pin being inserted into a passage in the mating connector ferrule, with a chamfered lead-in on the pin for alignment. The problems of maintaining precise tolerances with the alignment pins and their passages must be added to the tolerance problems in maintaining precise spacing and alignment of the individual holes for the optical fibers of the fiber optic cable. It can be understood why there is such a high number of rejects during the fabrication of prior art connector ferrules. The present invention is directed to solving the problems in the fabrication of a multi-fiber ferrule.

SUMMARY OF THE INVENTION

An object, therefore, of the invention is to provide a new and improved fixture for use in fabricating a connector ferrule for a fiber optic ribbon cable which includes a plurality of generally parallel optical fibers.

In the exemplary embodiment of the invention, the fixture includes a base, with a receptacle on the base for receiving and properly positioning a ferrule body. A cable locating means is provided on the base at one side of the receptacle for positioning the cable inserted into the ferrule body, with the exposed end portions of the optical fibers projecting from the front face of the ferrule body at an opposite side of the receptacle. A fiber aligning means is provided on the base at the opposite side of the receptacle for aligning the exposed end portions of the optical fibers relative to each other and relative to the properly positioned ferrule body.

As disclosed herein, the cable locating means is provided by a cable channel leading away from the receptacle. The channel has a major width and a minor depth for receiving a ribbon-type fiber optic cable wherein the fibers are in a line. The fiber aligning means is provided by a plurality of generally parallel grooves in a surface adjacent the opposite side of the receptacle.

A cable clamp is disposed on the base for holding the cable in the cable channel. In the preferred embodiment, the cable clamp is mounted on the base for movement between an open position exposing the cable channel to allow positioning the cable therein and a clamping position holding the cable in the channel.

A fiber clamp is disposed on the base for holding the fibers in the grooves of the aligning means. In the preferred embodiment, the fiber clamp is mounted on the base for movement between an open position exposing the grooves to allow positioning of the fibers therein and a clamping position holding the fibers in the grooves.

The fiber aligning means is located on a carriage movably mounted on the base for movement toward and away from the receptacle. The ferrule body includes alignment holes which surround alignment posts on the carriage when the carriage is moved toward the receptacle. The fiber aligning means may comprise a component or assembly with precision fiber alignment surfaces.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 10 is a top plan view of the fixture in closed condition with a ferrule and cable positioned therein;

DETAILED DESCRIPTION OF THE PREFERRED EMBODIMENT

Figure 1:
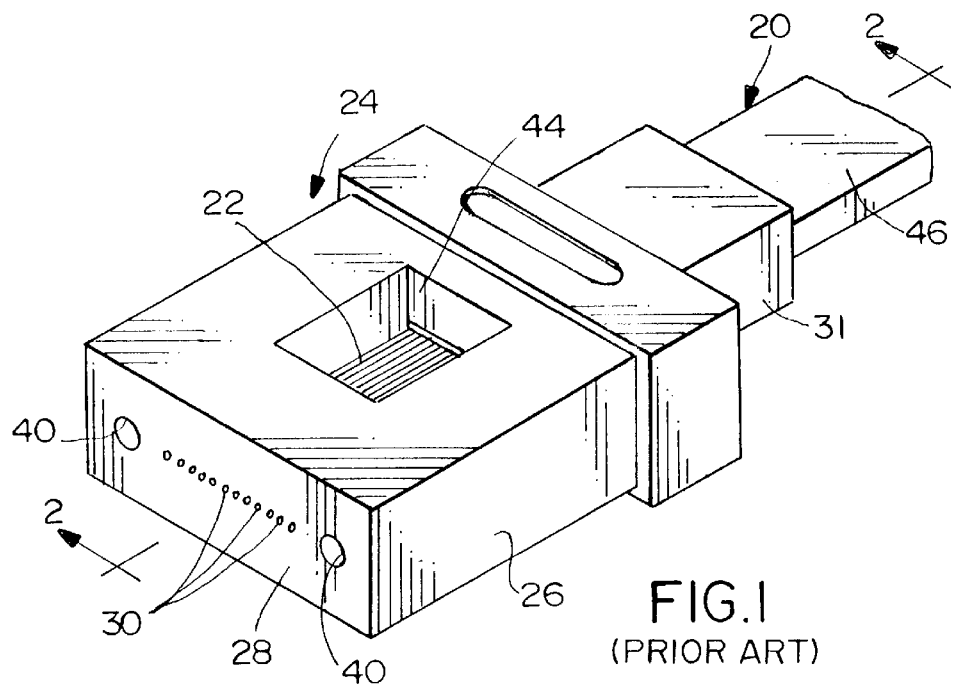
FIG. 1 is a front perspective view of a connector ferrule according to the prior art.
Figure 2:
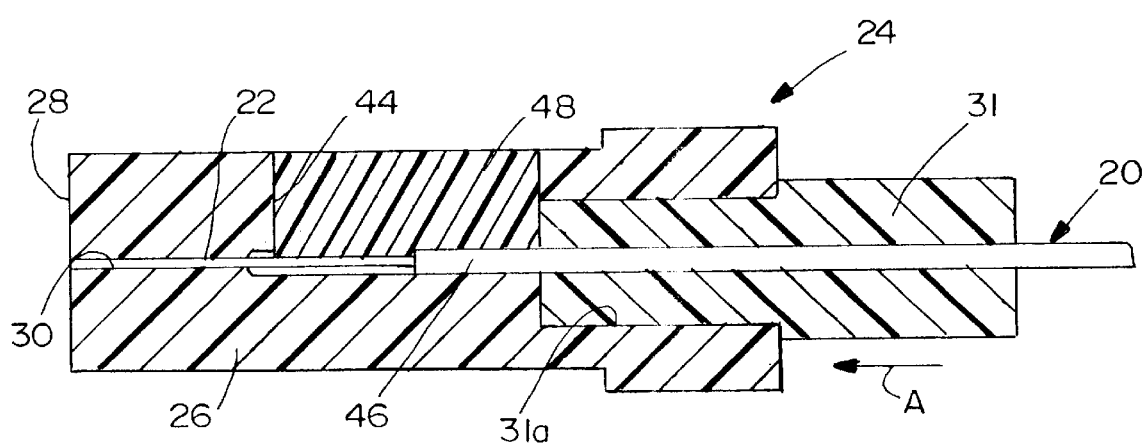
FIG. 2 is a vertical section taken generally along line 2—2 of FIG. 1.
Figure 3:
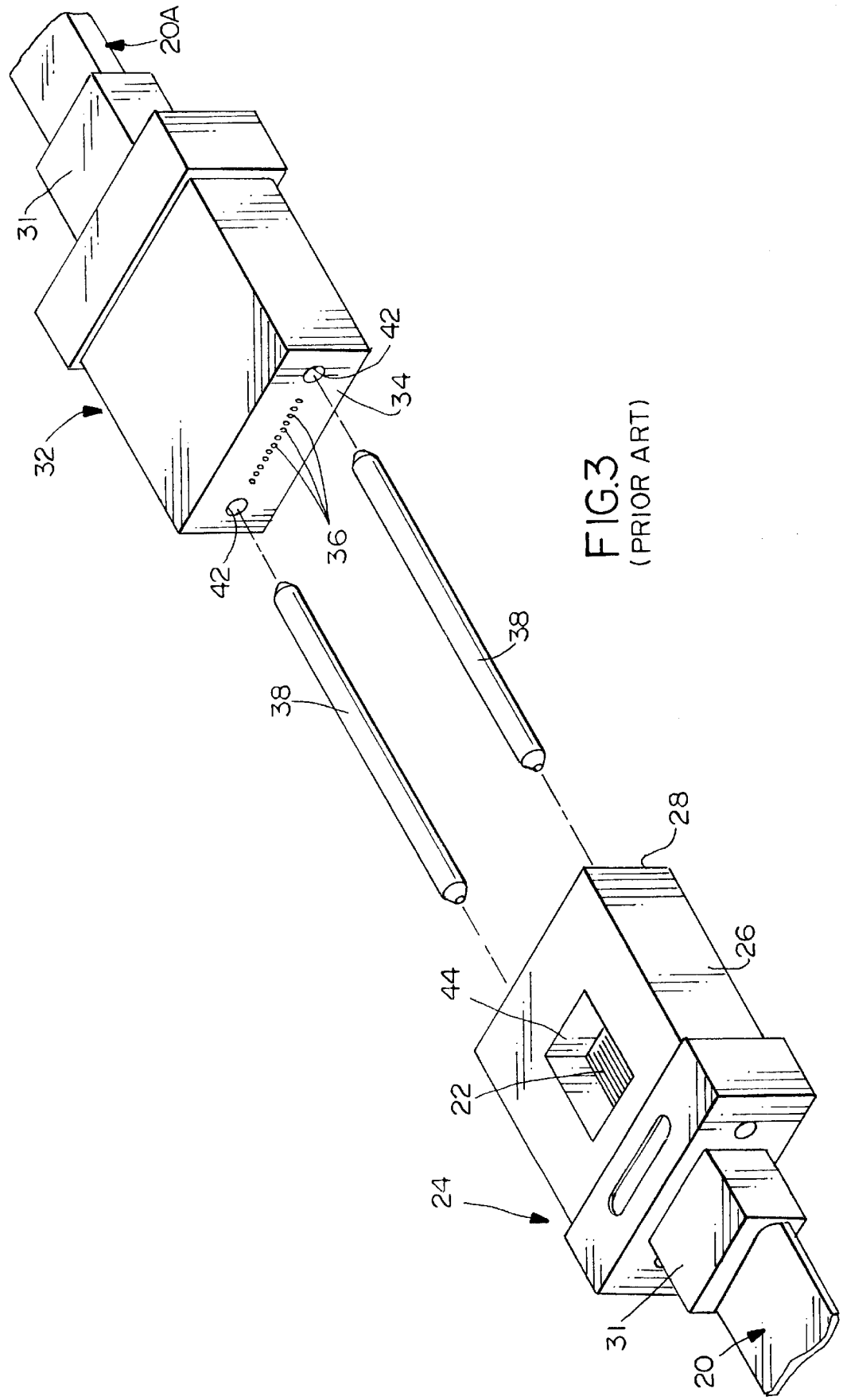
FIG. 3 is a perspective view of the prior art connector ferrule about to be terminated to a mating ferrule by using a pair of alignment pins.
Figure 4:
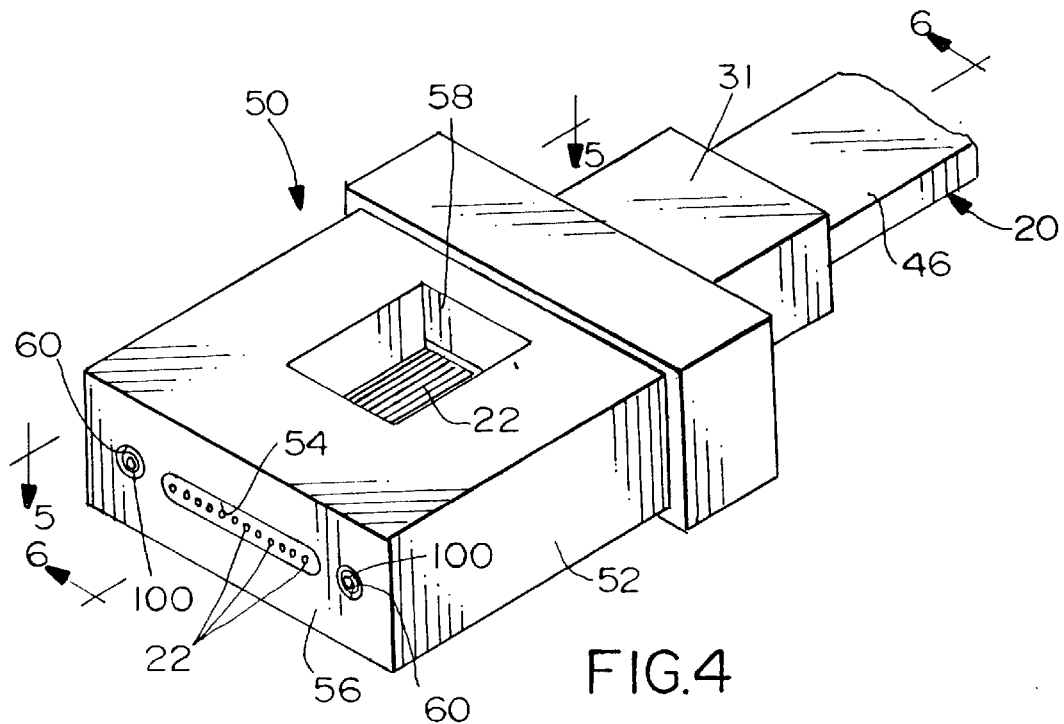
FIG. 4 is a front perspective view of a connector ferrule embodying the concepts of the invention.
Figure 5:
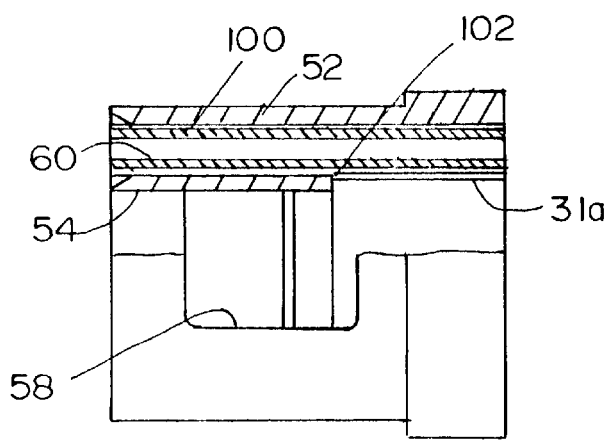
FIG. 5 is a fragmented horizontal section taken generally along line 5—5 of FIG. 4, but showing just the ferrule body and one of the bushings.
Figure 6:
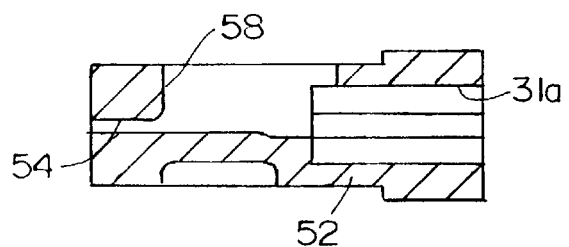
FIG. 6 is a vertical section taken generally along line 6—6 of FIG. 4, but showing just the ferrule housing.
Figure 7:
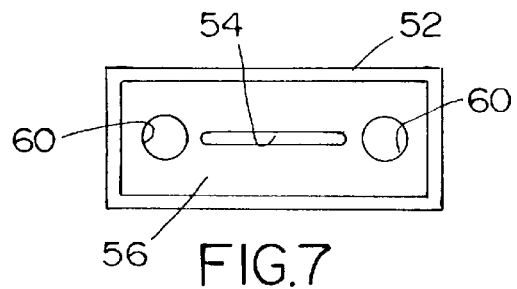
FIG. 7 is a front elevational view of the ferrule housing.
Figure 8:
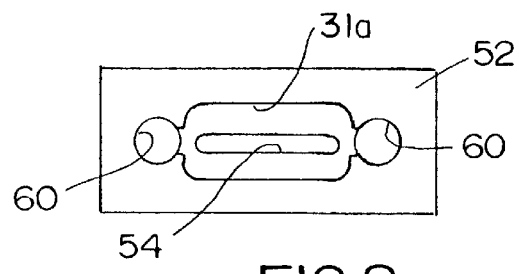
FIG. 8 is a rear elevational view of the ferrule housing.

Referring to the drawings in greater detail, FIGS. 1–3 show a connector ferrule according to the concepts of the prior art, and FIGS. 4–15 show a connector ferrule fabricated according to the concepts of the invention. As explained in the "Background", above, after a fiber optic cable is terminated in the ferrule, the ferrule then is assembled in an overall fiber optic connector assembly.

Before proceeding with a description of the prior art and of the invention, it should be explained that the connector ferrules are adapted for terminating a fiber optic ribbon cable, generally designated 20, which includes a plurality of discrete, generally parallel optical fibers 22 which are in a line or generally coplanar relationship. However, it should be understood that many concepts of the invention are equally applicable for any multi-fiber cable which includes a plurality of discrete fibers that must be aligned and properly spaced.

Turning first to FIGS. 1–3, a connector ferrule, generally designated 24, is shown according to the prior art. The ferrule includes a ferrule body 26 having a front planar mating face 28. As seen in FIG. 2, a plurality of fiber passages 30 extend through body 26 and into front mating face 28. As seen in FIG. 1, fiber passages 30 are in a line or row corresponding to the coplanar relationship of in-line optical fibers 22 of ribbon cable 20. A flexible boot 31 surrounds cable 20 at the rear of ferrule body 26 to provide strain relief for the cable. The boot is fixed, as by epoxy, in an opening 31a at the rear of the body.

Connector ferrule 24 of the prior art is adapted for mating with a complementary ferrule, or similar connecting device, generally designated 32 in FIG. 3. The connecting device is similar to ferrule 24 in that it has a front planar mating face 34 and a line of fiber passages 36 for receiving the individual fibers of a second fiber optic ribbon cable 20A. As is known in the art, ferrule 24 and connecting device 32 are mated by using a pair of alignment pins 38 which are inserted into alignment passages 40 (FIG. 1) of ferrule 24 and alignment passages 42 (FIG. 3) in connecting device 32. Alignment pins 38 are effective to align fiber passages 30 (FIG. 1) of ferrule 24 (FIG. 1) with fiber passages 36 (FIG. 3) of connecting device 32 and, correspondingly, aligning the optical fibers of cable 20 with the optical fibers of cable 20A.

In fabricating connector ferrule 24 according to the concepts of the prior art, it should be noted that ferrule body 26 has an opening 44 in the roof thereof which communicates with the interior of the body. Referring next to FIG. 2, it can be seen that ribbon cable 20 has a front end portion of its protective jacket 46 removed to expose the line of optical fibers 22. During fabrication, the cable is inserted into ferrule body 20 in the direction of arrow "A" (FIG. 2). During the insertion process, each individual optical fiber 22 must be inserted into its respective individual fiber passages 30. All the fibers are inserted into the passages simultaneously. Although not shown, typically, the fibers will extend beyond the front mating face 28 of the ferrule body. After all of the exposed fibers are inserted into their respective fiber passages 30, a premixed epoxy 48 (FIG. 2) is poured into top opening 44 to fix the cable, the fibers and the boot within the ferrule body. After the epoxy is allowed to cure, the fiber ends are cleaved adjacent to the front mating face of the ferrule body, and the fiber ends are polished as is known in the art.

Without repeating all of the problems explained in the "Background", above, it readily can be understood how difficult it is to insert exposed fibers 20 into their individual fiber passages 30. In addition, with this description of the prior art ferrule in FIGS. 1–3, the tolerance problems in maintaining proper spacing and alignment of fiber passages 30, plus proper spacing and alignment tolerance problems with pin passages 40, now can be fully understandable.

FIGS. 4–8 show a connector ferrule 50 embodying the concepts of the present invention. Again, the ferrule is constructed for terminating a fiber optic ribbon cable 20 which includes a plurality of generally parallel optical fibers 22 in a line or coplanar relationship. However, it will be recognizable that many concepts of the invention are equally applicable for other configurations of multi-fiber cables.

More particularly, connector ferrule 50 includes a ferrule body 52 having a fiber passage 54 which is elongated in cross-section to receive the entire line of optical fibers 22. In other words, one elongated passage 54 is provided for receiving therein all of the fibers of the cable. This is in contrast to the prior art which requires a single passage for each respective fiber of the cable. Connector body 52 also has a front planar mating face 56, a top opening 58, and a pair of passages 60 spaced from opposite ends of elongated fiber passage 54. Passages 60 can be called "pin passages", although the passages do not directly receive alignment pins 38 (FIG. 3) as in the prior art, as will be described in greater detail hereinafter.

According to the invention, epoxy is inserted or poured into opening 58 to surround the line of optical fibers 22 in elongated passage 54. That is why the epoxy will be referred to hereinafter as a "filler adhesive".

Figure 9:
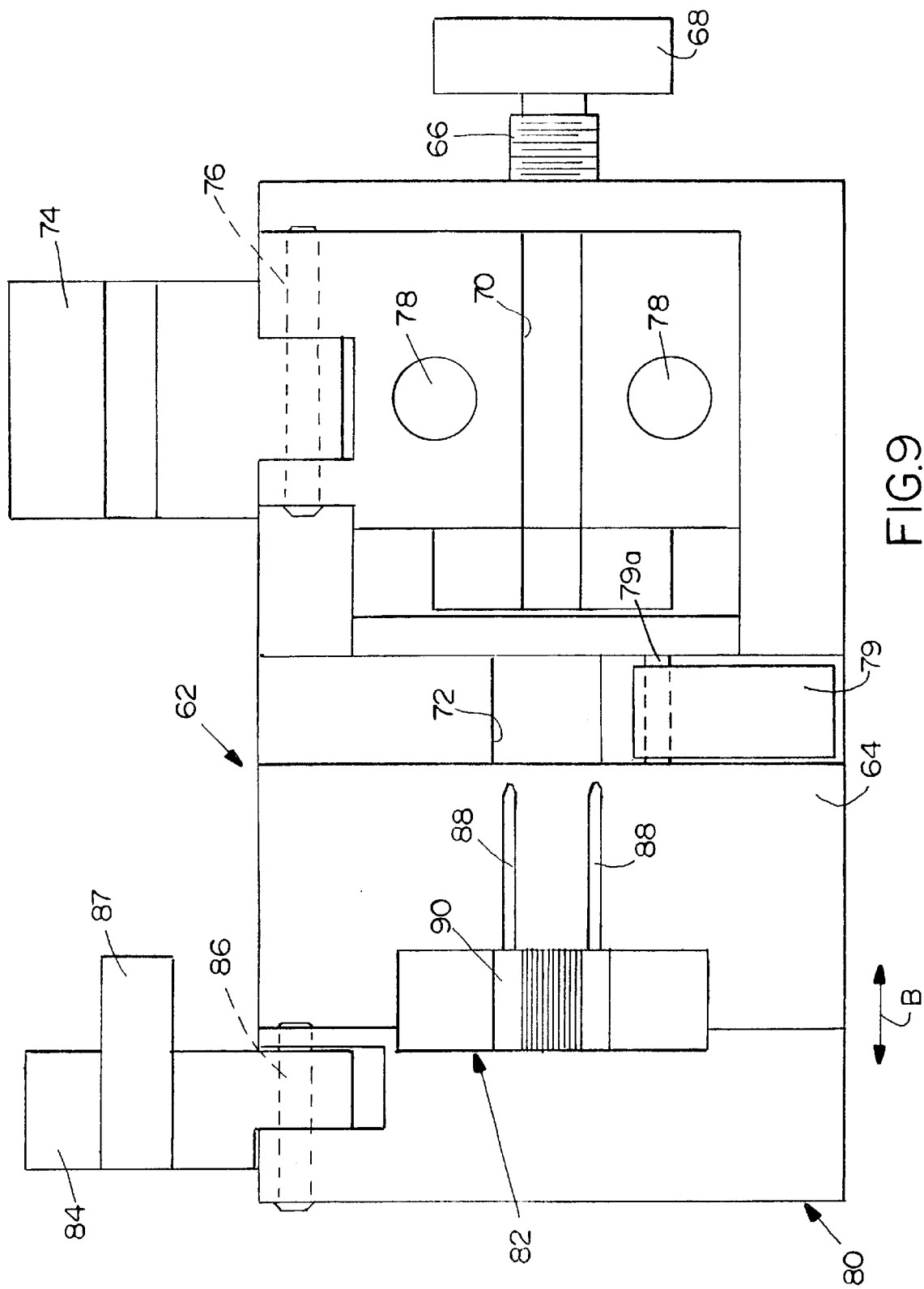
FIG. 9 is a top plan view of a fixture for terminating the fibers of a fiber optic ribbon cable in the connector ferrule of FIG. 4, with the fixture in open condition to receive the cable and ferrule body.

FIGS. 9 and 10 show a fixture, generally designated 62, which is used to hold ferrule body 52 and to precisely align fibers 22 within elongated fiber passage 54 of the body. The fixture is shown in an open or loading condition in FIG. 9 and in a closed or assembly condition in FIG. 10.

More particularly, fixture 62 includes a generally rectangular base or mounting block 64 which has an externally threaded rod or shaft 66 running therethrough within an internally threaded bore (not visible in the drawings). A manual rotating knob 68 is fixed to the outer distal end of shaft 66. As seen best in FIG. 9, a channel 70 is provided for receiving ribbon cable 20, and a receptacle 72 is provided for receiving ferrule body 52. Channel 70 has a major horizontal width and a minor vertical depth for receiving the flat ribbon-type cable. A cable clamp in the form of a cover 74 is pivoted to one side of base 64 on a pivot rod 76. The cable clamp is pivotally movable from an open position shown in FIG. 9 to a closed position shown in FIG. 10. In its open position, the cable clamp projects upwardly at an angle to base 64 and exposes channel 70. In its closed position, the cable clamp holds the ribbon cable in channel 70. Most of the components of fixture 62 can be fabricated of metal material, and a pair of magnets 78 (FIG. 9) can be used for holding cable clamp 74 in its closed, clamping position.

A ferrule clamp 79 holds a ferrule in receptacle 72. Like cable clamp 74, ferrule clamp 79 is pivoted, as at 79a, to base 64 between an open position exposing the receptacle and a closed position holding the ferrule in the receptacle.

A movable carriage, generally designated 80, is reciprocally movable in the direction of arrow "B" (FIG. 9) at an end of base 64 opposite cable-receiving channel 70 and cable clamp 74. Carriage 80 can be movably mounted on base 64 by a variety of mechanisms. A simple mechanism is to use shaft 66 which runs through base 64 and to connect a distal end of the shaft to the carriage, whereby threadingly rotating the shaft causes the shaft to move and move the carriage therewith.

Movable carriage 80 of fixture 62 includes a fixed alignment block, generally designated 82, and a pivotally movable fiber clamp 84. Like cable clamp 74, fiber clamp 84 is pivoted to one side of base 64 on a pivot rod 86. Fiber clamp 84 has a tongue 87 that projects in a direction toward receptacle 72. The fiber clamp is pivotable from an open, upwardly angled position shown in FIG. 9 and a closed position shown in FIG. 10. As will be seen hereinafter, fiber clamp 84 is effective to hold the fibers of the ribbon cable in position on fiber alignment block 82. The fibers can be held simply by the weight of fiber clamp 84, or appropriate magnets (like magnets 78) can be used to hold the fiber clamp down on the fibers. A pair of alignment posts 88 are shown in FIG. 9 projecting from fiber alignment block 82 toward receptacle 72 which receives one of the ferrule bodies 52. The alignment posts are insertable into passages 60 in the ferrule body, as will be described hereinafter.

FIGS. 11–14 show fiber alignment block 82 removed from fixture 62 to facilitate the illustration. More particularly, the fiber alignment block is a solid component having a chamfered trough 90 formed in the top thereof. As seen best in FIGS. 11 and 12, the side walls of trough 90 are tapered downwardly in a converging manner toward a bottom wall which includes a plurality of generally parallel grooves 92. The grooves are enlarged in FIG. 12 to show that they are semi-cylindrical in cross-section. It should be understood that the grooves also can be triangular or otherwise polygonal in cross-section. In any event, the grooves are spaced to precisely align fibers 22 within elongated fiber passage 54 of the ferrule body, as will be described in greater detail hereinafter. Fiber alignment block 82 can be fabricated as a high precision formed metal component or as a high precision formed crystalline component. In either instance, grooves 92 can be fabricated in a mutually spaced and aligned relationship with very high accuracy and precision.

Figure 11:
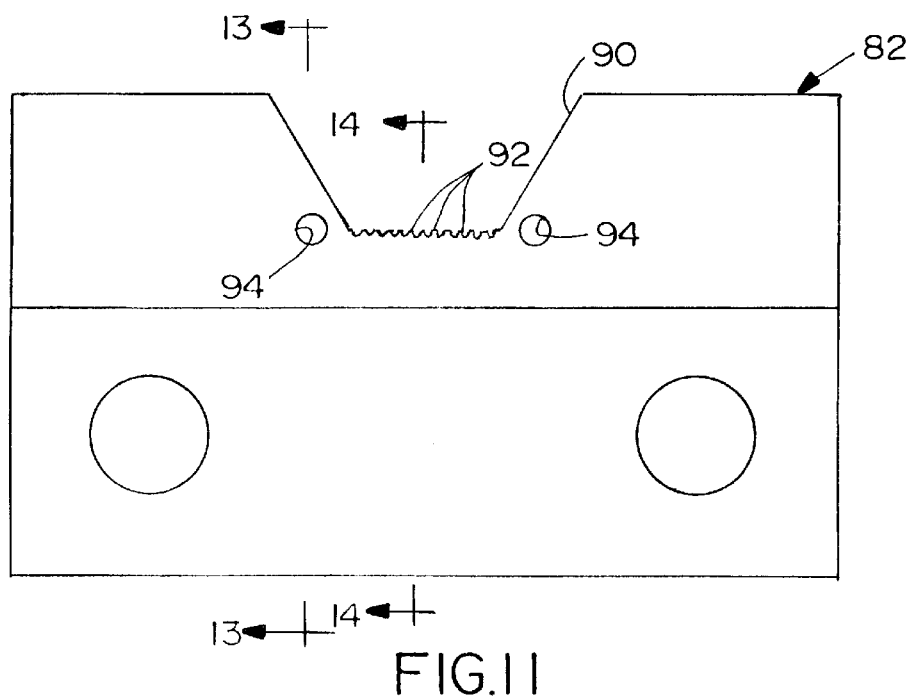
FIG. 11 is an end elevational view of the fiber alignment block of the fixture.
Figure 12:
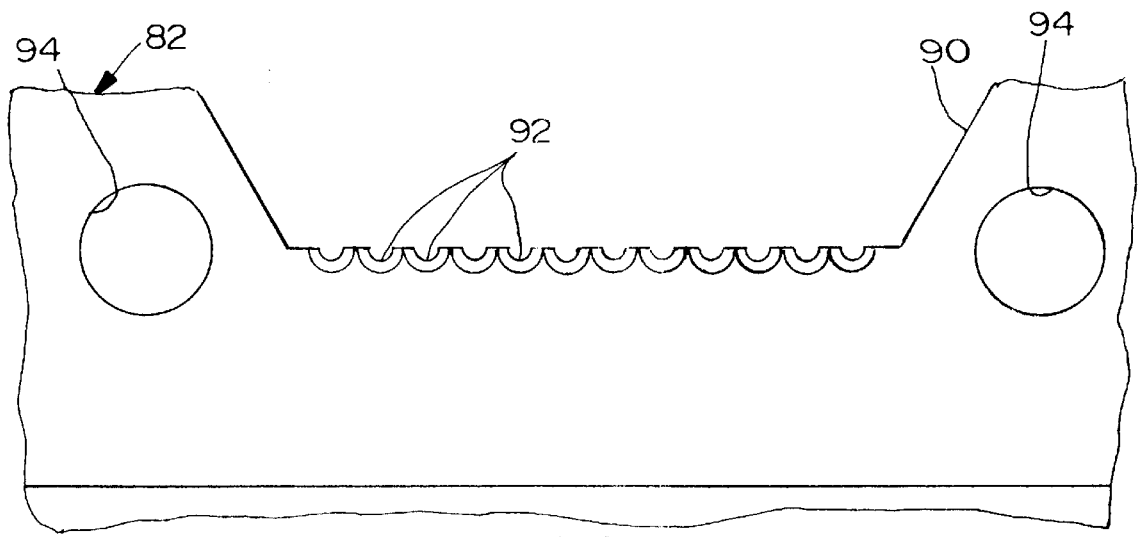
FIG. 12 is a fragmented end elevational view, on an enlarged scale, of the aligning grooves in the fiber alignment block.
Figure 13:
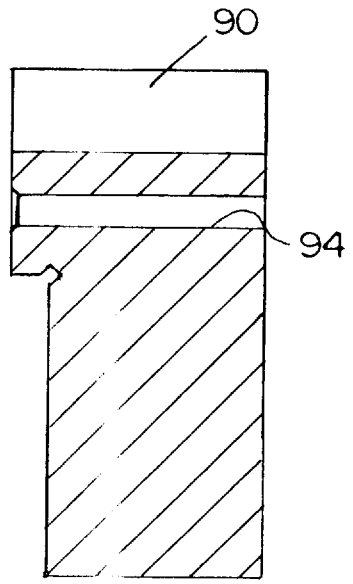
FIG. 13 is a vertical section taken generally along line 13—13 of FIG. 11.
Figure 14:
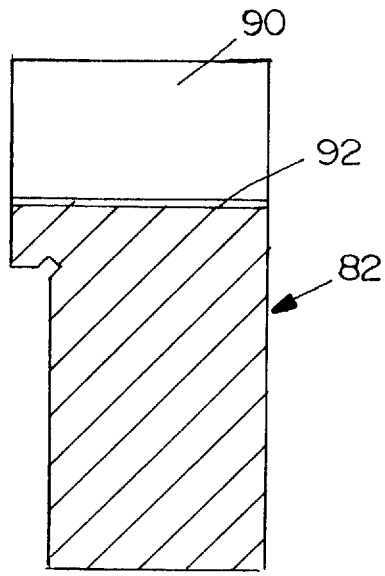
FIG. 14 is a vertical section taken generally along line 14—14 of FIG. 11.

Still referring to FIGS. 11–13, fiber alignment block 82 also has a pair of precisely located holes 94 which receive alignment posts 88 as described above in relation to FIG. 9. Again, holes 94 can be formed in alignment block 82 with very high accuracy and precision.

With the above detailed description of the structure of connector ferrule 50 and fixture 62, including fiber alignment block 82, the method of fabricating the connector ferrule now will be described. However, before proceeding with the method in detail, a quick reference should be made to FIG. 15 to visualize the size relationship between optical fibers 22 and elongated fiber passage 54 in ferrule body 52. As with the prior art, ribbon cable 20 is prepared by removing the protective jacket from an end portion of the cable to expose the line of optical fibers at the end portion. Prior to positioning the cable in the fixture, a pair of cylindrical bushings 100 (FIG. 15) are telescoped onto alignment posts 88. The cable then is placed into channel 70 of fixture 62, with cable clamp 74 in the open position as shown in FIG. 9. One of the ferrule bodies 52 is positioned in receptacle 72 of the fixture. The cable then is moved forwardly in channel 70 into the rear end of the ferrule body until fibers 22 project through enlarged, elongated fiber passage 54 in the ferrule body. In the alternative, the cable and fibers can be inserted into the ferrule body, and the cable and body simply lowered as a subassembly onto the top of the fixture, positioning the cable in channel 70 and the ferrule body in receptacle 72. In either event, cable clamp 74 then is pivoted from its open position (FIG. 9) to its closed position (FIG. 10), with magnets 78 holding the cable clamp down on the cable.

With the cable and ferrule body properly positioned in fixture 62 as described above, knob 68 at the end of externally threaded shaft 66 then is rotated to move carriage 80 in the direction of arrow "C" (FIG. 10). During this movement, the distal ends of alignment posts 88 (FIG. 9) first will enter passages 60 (FIG. 4) in the ferrule body. Bushings 100 will move with the alignment posts into passages 60. Further movement of the carriage will cause fiber alignment block 82 to move under distal ends of the exposed optical fibers which have been extended completely through the enlarged, elongated fiber passage 54 of the body beyond front face 56 of the body. With the carriage and alignment block 82 moved to the full "assembly" position shown in FIG. 10, all of the fibers will be juxtaposed over grooves 92 (FIG. 12) in the fiber alignment block. A small amount of manual manipulation may be needed to ensure that one fiber is in each groove. Fiber clamp 84 then is pivoted from its open position (FIG. 9) to its closed position (FIG. 10). During closing of the fiber clamp, projecting tongue 87 enters trough 90 of fiber alignment block 82 and holds the fibers in precision grooves 92.

Figure 15:
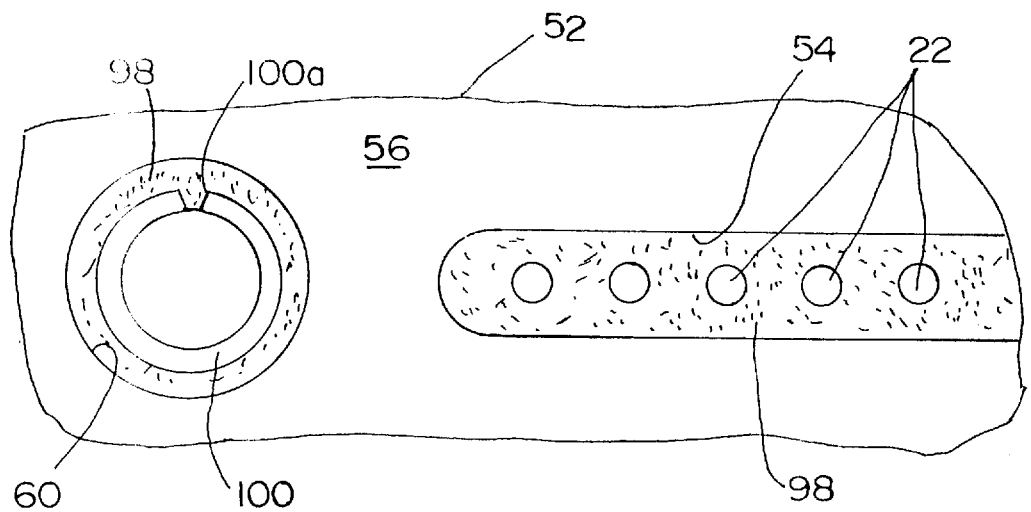
FIG. 15 is an enlarged fragmented end elevational view of the completely fabricated connector ferrule, showing one of the alignment bushings and some of the precisely aligned optical fibers surrounded by filler adhesive.

With the cable and ferrule body now being mounted in fixture 62, and with the fibers of the cable being precisely aligned by the grooves in alignment block 82, filler adhesive is then placed into opening 58 in the top of the ferrule body until the adhesive substantially fills the cavity. The elongated pin passage 54 will receive adhesive on the sides of the bushings 100 to captivate them in place. FIG. 15 shows filler adhesive 98 surrounding all of the individual fibers in the enlarged passage as well as around bushings 100 in passages 60. The filler adhesive then is allowed to cure. In the alternative, the entire fixture, including the positioned cable and ferrule body, along with the applied filler adhesive, then can be placed in an oven, if necessary, to heat-cure the filler adhesive.

After the adhesive is cured, alignment posts 88 move out of the precisely positioned bushings as carriage 80 is moved back away from the cured connector ferrule. To facilitate this process, posts 88 are lubricated prior to applying the filler adhesive. The fiber ends which project from mating face 56 of the ferrule body are then cleaved and polished. If any filler adhesive protrudes slightly from fiber passage 54 beyond mating face 56, the adhesive also is removed or polished-off.

Enlarged FIG. 15 shows the end result of the invention for precisely aligning fibers 22 within elongated fiber passage 54 and the bushings 100 in passages 60 which precisely align connector ferrule 50 with a complementary ferrule or other connecting device such as ferrule 32 described in relation to the prior art of FIG. 3. FIG. 15 shows a cylindrical bushing 100 inserted within one of the passages 60 in ferrule body 52 of the connector ferrule. Referring back to FIG. 5, it can be seen that a shoulder 102 is formed within each passage 60. This shoulder defines a stop limit for inserting boot 31. It can be seen in FIG. 15 that passage 60 is slightly larger in diameter than the outside diameter of bushing 100. Consequently, capillary action will cause filler adhesive 98 to fill the space between the outside of the bushing and the inside of the passage and precisely align the bushing relative to the second bushing but also relative to fibers 22 fixed within the connector ferrule. It can be seen in FIG. 15 that the bushings are slit, as at 100a. The bushings, thereby, expand when telescoped onto alignment posts 88, to the exact diameter of the posts. The posts can be fabricated with precision and accuracy, and this accuracy is transferred to the bushings. When filler adhesive 98 cures, the bushings are secured at the exact diameters of the alignment posts.

From the foregoing, it is readily apparent that the invention is a vast improvement over the prior art. In essence, the fiber passages and pin passages in the ferrule body of the invention are not used to align the fibers and alignment pins. A separate fixture of high precision is used outside the connector ferrule and, in essence, these precision parameters are transferred to the ferrule. By transferring the precision from the fixture to the ferrule as is contemplated by the present invention, the parameters of the resulting ferrules are very consistent and repeatable. This process can be fine tuned or adjusted simply by modifying the fixture. Still further, with fiber passage 54 being considerably larger than the fibers themselves, the same ferrule body can be used for different sizes of fibers which is not possible with the prior art. In fact, a single ferrule body, with its enlarged, elongated fiber passage can be used to accommodate fiber optic cables of different numbers of fibers. Again, this is not possible with the prior art, because the number and sizes of the fiber passages must be varied in attempts to arrive at any consistency whatsoever.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fixture for use in fabricating a connector ferrule for a fiber optic cable which includes a plurality of generally parallel optical fibers, comprising:

a base;

a receptacle on the base for receiving and properly positioning a ferrule body;

a cable locating means on the base at one side of the receptacle for positioning the cable inserted in the ferrule body, with exposed end portions of the optical fibers projecting from the ferrule body at an opposite side of the receptacle; and a fiber aligning means on the base at said opposite side of the receptacle for aligning the exposed end portions of the optical fibers relative to each other and relative to the properly positioned ferrule body.

2. The fixture of claim 1 wherein said cable locating means include a cable channel leading away from the receptacle.

3. The fixture of claim 2 wherein said fiber optic cable is a ribbon cable, and said cable channel has a major width and a minor depth.

4. The fixture of claim 2, including a cable clamp on the base for holding the cable in the cable channel.

5. The fixture of claim 4 wherein said cable clamp is pivotally mounted on the base for movement between an open position exposing the cable channel to allow positioning the cable therein and a clamping position holding the cable in the channel.

6. The fixture of claim 1 wherein said fiber aligning means include a plurality of generally parallel grooves in a surface adjacent said opposite side of the receptacle.

7. The fixture of claim 6 wherein said fiber aligning means comprises a metal component and said grooves are precision formed in a surface thereof.

8. The fixture of claim 6 wherein said fiber aligning means comprises a crystalline component and said grooves are precision formed in a surface thereof.

9. The fixture of claim 6, including a fiber clamp on the base for holding the fibers in said grooves.

10. The fixture of claim 9 wherein said fiber clamp is pivotally mounted on the base for movement between an open position exposing the grooves to allow positioning the fibers therein and a clamping position holding the fibers in the grooves.

11. The fixture of claim 1 wherein said fiber aligning means is on a carriage movably mounted on the base for movement toward and away from the receptacle.

12. The fixture of claim 11 wherein said ferrule body includes at least one alignment hole, and said carriage includes an alignment post for movement into the hole when the carriage is moved toward the receptacle.

13. A fixture for use in fabricating a connector ferrule for a fiber optic ribbon cable which includes a plurality of generally parallel optical fibers in a line, comprising:

a base;

a receptacle on the base for receiving and properly positioning a ferrule body;

a cable locating means on the base at one side of the receptacle for positioning the cable inserted into the ferrule body, with exposed end portions of the optical fibers projecting from the ferrule body in a line at an opposite side of the receptacle, the cable locating means being in the form of a cable channel leading away from the receptacle, with the cable channel having a major width and a minor depth for receiving and properly positioning the ribbon cable; and a fiber aligning means on the base at said opposite side of the receptacle for aligning the exposed end portions of the optical fibers relative to each other and relative to the properly positioned ferrule body, the fiber aligning means including a row of generally parallel grooves in a surface adjacent said opposite side of the receptacle for positioning the line of exposed fiber end portions therein.

14. The fixture of claim 13, including a cable clamp on the base for holding the cable in the cable channel.

15. The fixture of claim 14 wherein said cable clamp is pivotally mounted on the base for movement between an open position exposing the cable channel to allow positioning the cable therein and a clamping position holding the cable in the channel.

16. The fixture of claim 13, including a fiber clamp on the base for holding the fibers in said grooves.

17. The fixture of claim 16 wherein said fiber clamp is pivotally mounted on the base for movement between an open position exposing the grooves to allow positioning the fibers therein and a clamping position holding the fibers in the grooves.

18. The fixture of claim 13 wherein said fiber aligning means is on a carriage movably mounted on the base for movement toward and away from the receptacle.

19. The fixture of claim 18 wherein said ferrule body includes at least one alignment hole, and said carriage includes an alignment post for movement into the hole when the carriage is moved toward the receptacle.

20. The fixture of claim 13 wherein said fiber aligning means comprises a metal component and said grooves are precision formed in a surface thereof.

21. The fixture of claim 13 wherein said fiber aligning means comprises a crystalline component and said grooves are precision formed in a surface thereof.

* * * * *